July 5, 1927.
W. M. SHEEHAN
TRUCK
Filed June 9 1926
1,634,307
2 Sheets-Sheet 1
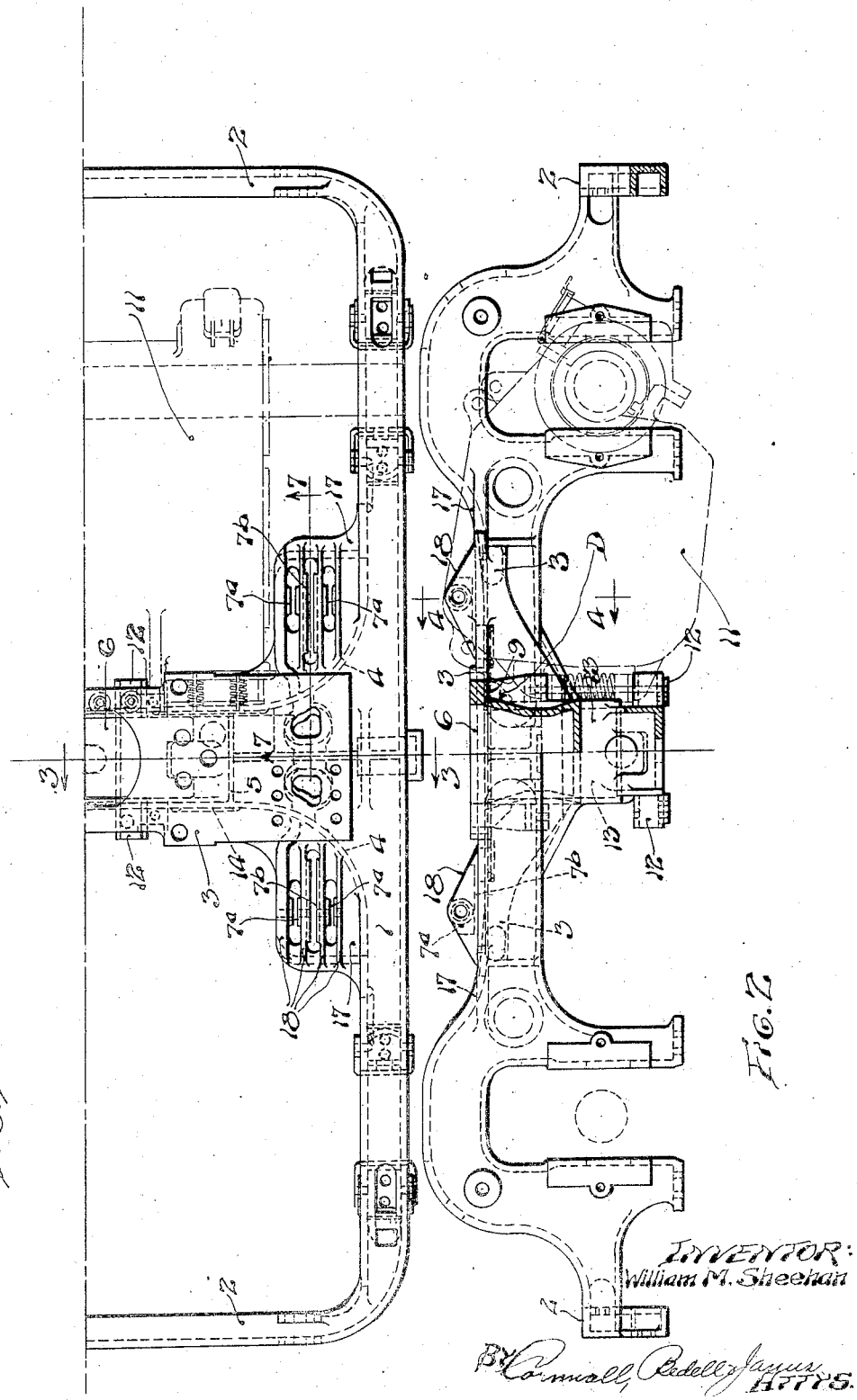

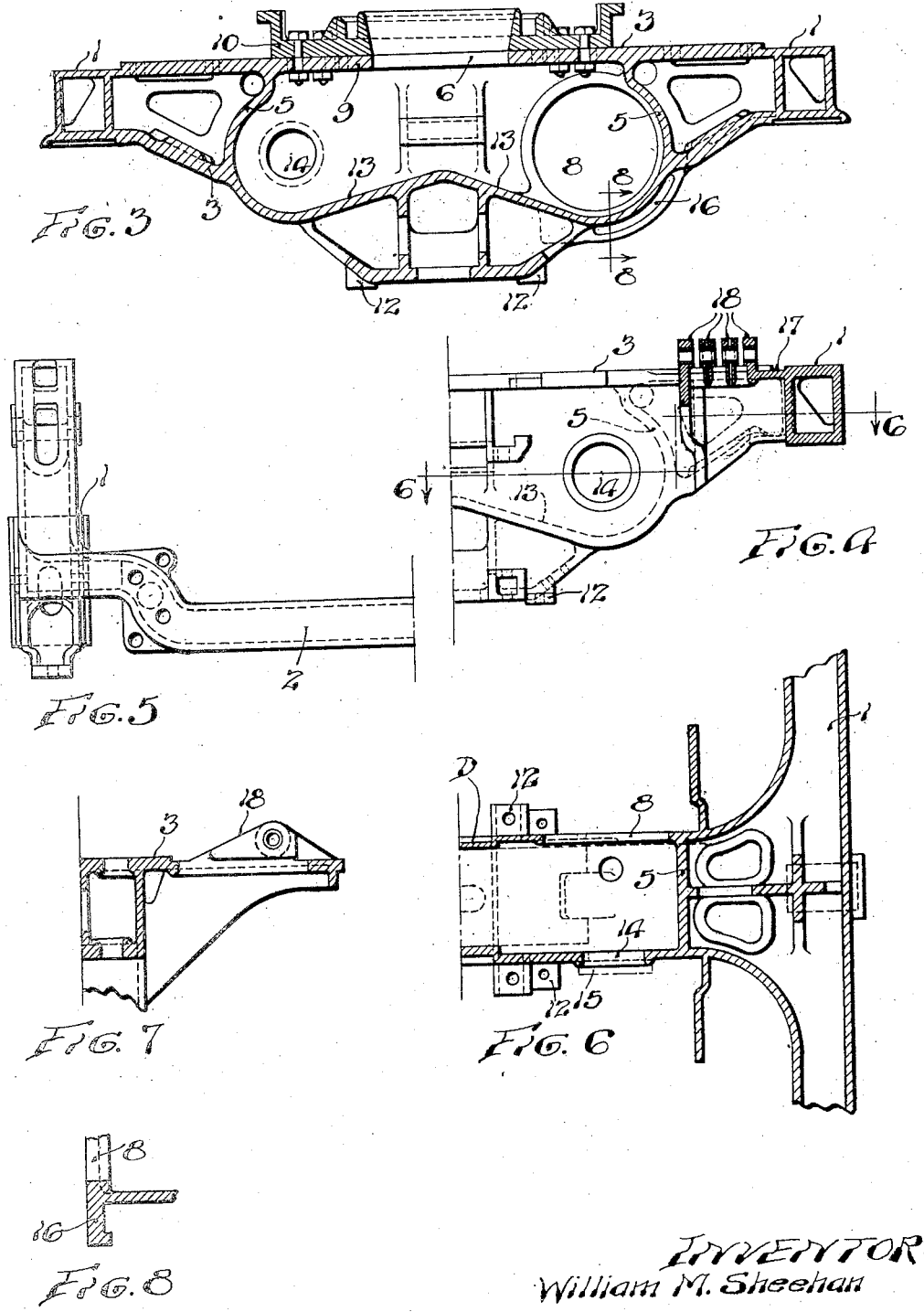

Patented July 5, 1927.

1,634,307

UNITED STATES PATENT OFFICE.

WILLIAM M. SHEEHAN, OF ST. LOUIS, MISSOURI, ASSIGNOR TO COMMONWEALTH STEEL COMPANY, OF GRANITE CITY, ILLINOIS, A CORPORATION OF NEW JERSEY.

TRUCK.

Application filed June 9, 1926. Serial No. 114,742.

My invention relates to railway rolling stock and consists in an improved truck construction particularly adapted for use under electric locomotives.

The main object of my invention is to provide a truck transom structure adapted to facilitate the passage of air from the locomotive superstructure to the electric motors mounted on the truck.

Other objects of my invention are to combine in such a transom, suitable motor mounting brackets; to combine my improved transom with the remainder of the truck frame; and preferably to form my transom by casting the same in one piece, either with or without including the wheel pieces and other parts of the truck frame.

In the accompanying drawings which illustrate a selected embodiment of my invention,—

Figure 1 is a one-half longitudinal view of a truck frame embodying my invention.

Figure 2 is in part a side elevation and in part a central longitudinal section through the frame illustrated in Figure 1.

Figure 3 is a vertical transverse section taken on the center line 3—3 of Figure 1.

Figure 4 is a similar section taken on line 4—4 of Figure 2.

Figure 5 is a one-half end view of the truck.

Figure 6 is a horizontal section taken on line 6—6 of Figure 4.

Figure 7 is a vertical longitudinal section taken on line 7—7 of Figure 1.

Figure 8 is a vertical longitudinal section taken on line 8—8 of Figure 3.

The main portions of the frame are the wheel pieces 1, end rails 2, and a centrally located transom 3. The wheel pieces are preferably box-shaped in cross section to provide maximum strength for the amount of material utilized, and the transom 3 has the same general shape. The side walls of the transom merge with the side walls of the wheel piece by means of arcuate portions 4. At the inner ends of these arcuate portions the side walls of the transom are connected by transverse walls 5 which convert the transom into a closed box-like member.

The top wall of the transom is provided with a central opening 6 and the side walls of the transoms are provided with one or more openings 8, preferably spaced from the center line of the truck. The opening 6 is an inlet opening to the interior of the transom for admitting a current of air delivered to the truck from the blowers or compressors mounted on the superstructure, not shown, and this inlet opening is surrounded by a center plate bearing portion 9. The center plate 10 is indicated in Figure 3 and is shown as having a central opening corresponding in extent to the opening 6 in the top wall of the transom.

The bottom wall 13 of the transom extends downwardly in opposite directions from the longitudinal center line of the truck and its outer ends curve upwardly to merge with walls 5 and form semi-circular ends for the air conduits in the transom, the axes of which ends are substantially aligned with the openings 8. This formation of the bottom wall serves to divide the air current into two parts, one of which is directed to one side of the truck and to the rear to cool one motor, and the other portion of which is directed to the opposite side of the truck and to the front thereof to cool the other motor.

The motors are indicated at 11 and are mounted upon the truck axles and upon the brackets 12 formed on the lower part of the transom below the bottom wall 13.

The top and side walls of the transom are depressed as indicated at D to afford clearance for the motor nose and to permit the motor gear to be disengaged from the axle gear and the motor moved away from axle when it is desired to operate the truck without using one or both motors.

Each of the side walls of the transom has a relatively small opening 14 in line with the large opening 8 in the opposite wall of the transom. This opening is provided for facilitating the machining of the interior of the transom and after the frame is completed the opening 14 is closed by a plate 15 welded to the surrounding portion of the transom (see Figure 6).

The outer portion of the air conduit portion of the transom is reinforced by suitable flanged ribs 16 and the jointures between the transom and wheel pieces are reinforced by suitable corner gussets 17, each of which preferably carries upstanding lugs 18 provided with bosses 7ª and 7ᵇ for receiving a mounting brake rigging element (not shown), this particular structure being described and claimed in my copending application Serial Number 114,743, filed June 9, 1926. I also refer to my copending application Serial Number 100,840, filed April 9, 1926, in which I describe and claim a cab underframe for which the present truck is designed.

I claim:

1. In a locomotive truck, a transom forming part of the truck frame and forming an air duct and having an inlet opening in its top wall, and a center plate supported on said transom above said opening and having a central opening for passage of an air current from a conduit in the locomotive superstructure.

2. In a locomotive truck, a transom forming part of the truck frame and forming an air duct, there being an inlet opening in the top of the transom and a plurality of outlet openings in the sides of said transom.

3. In a locomotive truck, a transom forming part of the truck frame and forming an air duct, there being an inlet opening in the center of the top wall of the transom and a plurality of outlet openings in the sides of said transom at points spaced from the center of the transom.

4. In a locomotive truck, a transom forming part of the truck frame and forming an air duct, there being an inlet opening in the top of the transom and a plurality of outlet openings in the sides of said transom on opposite sides of the center of the transom.

5. In a locomotive truck, a transom forming part of the truck frame and forming an air duct, there being an inlet opening in the top of the transom and a plurality of outlet openings in the sides of said transom on opposite sides of the center of the transom and facing in opposite directions.

6. In a locomotive truck, a transom forming part of the truck frame and forming an air duct, there being an inlet opening in the top of the transom and a plurality of outlet openings in the sides of said transom directed in opposite directions longitudinally of the truck.

7. In an electric locomotive truck, a one piece casting forming part of the truck frame and comprising a hollow transom, the side walls of which form a duct for conveying an air stream to the locomotive motor.

8. In an electric locomotive truck frame, a transom member comprising in part a closed box with inlet and outlet openings for an air current for cooling the locomotive motor.

9. In a locomotive truck, a one-piece casting comprising a hollow transom, the walls of which form an air duct, there being motor supporting brackets on the exterior of said transom and an outlet opening leading from said conduit adjacent to said brackets.

10. A locomotive truck transom comprising a long box shape with a central air inlet opening in its top wall and having a bottom wall inclined downwardly in opposite directions from beneath said opening, there being outlet openings in the sides of said transom near the ends of said box shape, said outlet openings extending substantially throughout the full depth of the box shape.

11. A locomotive truck transom comprising a long box shape with a central air inlet opening in its top wall and having a bottom wall inclined downwardly in opposite directions from beneath said opening, there being outlet openings in the sides of said transom near the ends of said box shape adjacent in part to the depressed portion of said bottom wall.

12. A casting comprising a locomotive truck transom which includes an air duct having a box-like shape with a bottom wall inclined downwardly from both sides of the center line, and an integral downward projection formed on the central part of said wall and including motor supporting brackets.

13. In a one-piece casting comprising a truck frame and including wheel pieces box-shape in cross section, a transom formed integrally with said wheel pieces and box-shape in cross section, the adjacent side walls of said wheel pieces and transom merging into each other, and transverse walls in said transom closing the interior of the same from the interior of said wheel pieces to form an air chamber in said transom only.

14. A locomotive truck transom comprising a box-shape with a central air inlet opening in its top wall and having a bottom wall inclined downwardly in opposite directions from beneath said opening and terminating in an upwardly curved portion, there being an arcuate flanged reinforcing rib on the exterior of said curved wall portion.

15. A locomotive truck transom of box-shape to form an air duct, there being an opening in one of the transom walls for free outlet of air, and a reinforcing flange on the exterior of said box shape adjacent to said opening.

16. A casting comprising a locomotive truck transom forming an air duct and having an integral motor supporting bracket on its exterior and having a depressed portion in its side wall for receiving the motor nose.

17. In a locomotive truck frame, a transom having side walls with spaced brackets for supporting a motor and having a depressed portion between said brackets for accommodating a motor nose projecting beyond the bracket supported portion of the motor.

In testimony whereof I hereunto affix my signature this 3rd day of June, 1926.

WILLIAM M. SHEEHAN.